(No Model.)
E. S. ROSEBERRY & W. H. FICKEL.
CHECK ROW PLANTER.
No. 593,124. Patented Nov. 2, 1897.
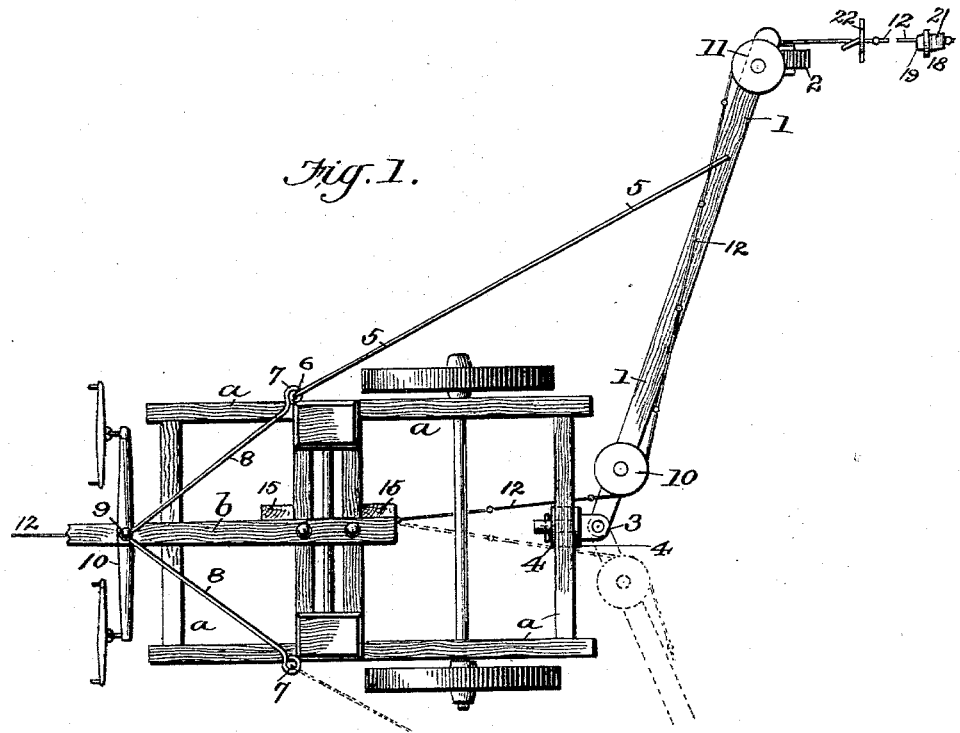
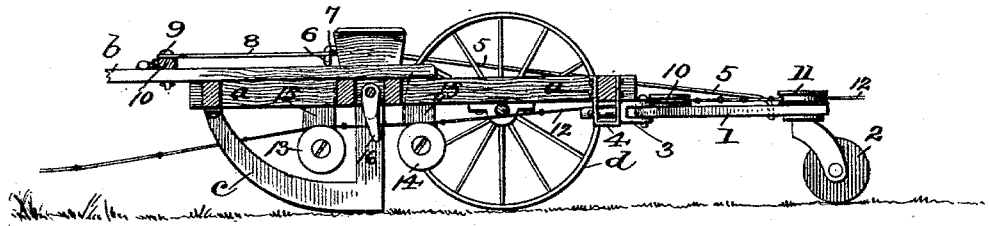
WITNESSES:
Jos. A. Ryan
Amos W. Hart
INVENTORS:
Edward S. Roseberry
William H. Fickel
BY
ATTORNEYS.

UNITED STATES PATENT OFFICE.

EDWARD S. ROSEBERRY AND WILLIAM H. FICKEL, OF HURDLAND, MISSOURI.

CHECK-ROW PLANTER.

SPECIFICATION forming part of Letters Patent No. 593,124, dated November 2, 1897.

Application filed August 7, 1897. Serial No. 647,397. (No model.)

*To all whom it may concern:*

Be it known that we, EDWARD S. ROSEBERRY and WILLIAM H. FICKEL, of Hurdland, in the county of Knox and State of Missouri, have invented a new and Improved Check-row Planter, of which the following is a specification.

It is the object of our invention to provide an improved check-row attachment for planter which is simple in construction, efficient and reliable in operation, and to which the wire or cord may be applied or from which it may be detached with great ease and rapidity. The arrangement of the wire with the planter is such that it lies close to the ground and passes between the horses.

In the accompanying drawings, Figure 1 is a plan view of our improved machine as it appears in use. Fig. 2 is a longitudinal section of the same. Fig. 3 is a perspective view illustrating the use and operation of wire-anchoring devices.

The rectangular frame $a$ of the planter is provided with a rigid tongue or pole $b$, runner-like furrow-openers $c$, and transporting-wheels $d$, which may also be used as furrow closers or coverers. About the construction of these parts there is nothing new, and we do not illustrate them with entire detail.

The check-row attachment is constructed and attached as follows: A long flat bar or arm 1 is swiveled to the rear end of the planter-frame $a$ and supported at its outer end by a caster-wheel 2, (sometimes termed a "crazy" wheel.) The means of connection between the said bar 1 and frame $a$ is a clevis-like device 3, Fig. 1, which is journaled in a rigid pendent bracket 4, so that it is free to rotate on its horizontal axis. The bar 1 is pivoted in such device 3, and thus a universal or swivel joint is formed that allows said bar to be shifted from side to side of the machine, as hereinafter explained, and also permits its free end to rise and fall, as required for the caster-wheel 2 to follow the undulations of the field or pass over stones, clods, or other small obstructions. It will be further seen that in the regular operation of the machine, as when turning more or less to the right or left, the caster-wheel travels or follows in the right course automatically.

The bar 1 is loosely connected by means of a brace and tension rod 5 with either side of the machine at a point just in front of the wheels. The said rod 5 is pivoted to the bar 1, and its front end is constructed as a hook 6 to adapt it to engage with the eye 7, formed on the rear end of tension wires or rods 8, that extend forward diagonally to a common point, which is the bolt 9, that pivots the doubletree 10 to the tongue $b$. By this means and arrangement of them the tractive strain of the swiveled guide-arm 1 is applied through the hooked rod 5 in a straight line to the doubletree and tongue, so that the frame $a$ of the planter is relieved of lateral or torsional strain. It will be understood also that in shifting the bar 1 from one side to the other of the machine the said rod 5 is first detached from the eye 7, which it engages, and then after the bar 1 has been swung over (see dotted lines, Fig. 1) the rod 5 is engaged with the other eye 7 on the other side.

Two pulleys 10 and 11 are journaled on the upper side of bar 1, one, 10, being arranged close to the pivot end of the bar and the other, 11, contiguous to the free end of the same. The wire 12, that operates the seed-discharging mechanism (not shown) of the planter, is stretched across the field to be drilled or planted and passes under the machine, being supported on and guided by two pulleys 13 and 14, Fig. 2, hung vertically on rigid bars 15, pendent from the central portion of the planter-frame $a$, and passes through a forked guide 16, arranged equidistantly between said pulleys 13 14, as shown. From the rear pulley 14 the wire 12 passes around one side of the pulley 10 at the inner end of the swiveled bar 1, and thence around the opposite side of the pulley 11 on the outer end of same, as shown. From the machine the wire 12 extends in straight and parallel lines to the anchors 18, which are located at opposite sides or ends of the field. It will be seen that the portion of the wire 12 which extends forward passes under the tongue or pole $b$, and hence the horses or other draft-animals must travel on opposite sides of it.

Each end of the wire is attached to an anchor or stake pin 18, Fig. 3, which consists, primarily, of an iron bar or rod provided with a footrest 19 for use in forcing it into the ground and with a lateral prong to prevent it twisting or turning in the ground. It is further provided with a bowed plate-spring 21, which is attached to the upper portion of the stake-pin 18 and to whose free pendent end the wire 12 is attached. The pin 18 is so adjusted when in use that the spring 21 is on the side farthest from the machine. For this purpose the lower end of the spring may be forked and slightly hook shape, as shown. It is apparent the anchor-springs 21 at the ends of the field apply tension in opposite directions to take up the slack of the wire 12.

The springs 21 take up slack in the wire in the first instance, but after the machine has crossed the field once there is no more slack, and the same tension of the wire thus obtained is held till the field has been finished.

For holding the wire at points adjacent to the anchor or stake pins 18, while the same is thrown off the planter and the latter turns around at the ends of the rows, we employ pronged devices 22, Fig. 3, which we term "tension-holders." The same are set over the wire and forced into the ground, as shown. After the planter has been turned around the wire 12 is again put on the machine and on the pulleys 10 and 11 on the shiftable guide-bar 1 and the end of the wire is attached to the stake-pin. The tension-holders hold the wire down on the ground so that the team can easily turn the planter over it, so that the wheels and horses come on oppposite sides of it.

It will be noted that the track of the caster-wheel 2 coincides with the wire 12, so that guiding the machine is comparatively easy and the rows are made with great accuracy. In other words, the checking is practically perfect even if the driver be quite inexperienced.

It will further be seen that by the arrangement of wire beneath the machine and on the suspended guide-pulleys the wire does not require to be dragged over the machine, but is simply dropped off the machine and the swiveled guide-bar and as easily put on again.

What we claim is—

1. In a check-row planter, the combination with the suspended wire-carrying pulleys, arranged beneath it, of the guide bar or arm which is swiveled to the rear end of the planter-frame, a caster-wheel supporting the free end of said bar, pulleys arranged on its upper side, and the shiftable brace and tension rod, all arranged as shown and described to operate as specified.

2. In a check-row planter, the combination of the wire and devices for anchoring it and securing it close to the ground, the planter having wire-carrying pulleys beneath it, the swiveled guide-bar attached to the rear of the frame, the caster-wheel supporting the free end of said bar, wire-guide pulleys on the upper side of the latter, and the brace and tension rod, made detachable at its forward end, all as shown and described.

3. In a check-row planter, the combination with the planter-frame, tongue and doubletree, tension-wires attached to the latter and extending diagonally rearward and having loops at their rear ends, the shiftable guide-bar swiveled to said frame, and provided with a supporting-wheel and wire-carrying pulleys, and the brace and tension rod pivoted to said bar and adapted for detachable connection with the said tension-wires, as shown and described.

4. In a check-row planter, the combination with the planter proper, of the wire-guide bar, swiveled to the rear end of the former, and having a supporting caster-wheel attached to its rear end, on the under side of the same, as shown and described.

5. In a check-row planter, the frame having two pendent wire-guide pulleys supported beneath the same, a bracket pendent from the rear end of said frame, the rear guide-bar which is swiveled to such bracket and thus attached at a point below the frame proper, and pulleys arranged on said bar, for receiving and guiding the wire as it passes rearward and beneath the frame, from the first-mentioned pulleys, as shown and described.

EDWARD S. ROSEBERRY.
WILLIAM H. FICKEL.

Witnesses:
JOHN F. BEAL,
JOHN BEERS.